United States Patent [19]

Pakula

[11] Patent Number: 5,476,117
[45] Date of Patent: Dec. 19, 1995

[54] RETROFIT SECOND PACKING CHAMBER FOR QUARTER-TURN VALVES

[76] Inventor: Barry S. Pakula, 11012 Tam-O-Shanter Dr., Carmel, Ind. 46032

[21] Appl. No.: 340,530

[22] Filed: Nov. 16, 1994

[51] Int. Cl.⁶ .......................... F16K 41/04; F16K 43/00; F16J 15/20
[52] U.S. Cl. .................. 137/312; 137/315; 251/214; 277/105; 277/106; 277/123
[58] Field of Search .......................... 251/214; 277/105, 277/106, 123, 124, 125; 137/15, 315

[56] References Cited

U.S. PATENT DOCUMENTS

| | | | |
|---|---|---|---|
| 2,126,366 | 8/1938 | Boyer | 277/105 |
| 3,787,060 | 1/1974 | Astill | 251/214 |
| 4,336,919 | 6/1982 | Hall | 251/214 |
| 4,345,766 | 8/1982 | Turanyi | 277/106 |
| 4,765,631 | 8/1988 | Kohnen et al. | 277/106 |
| 4,972,867 | 11/1990 | Ruesch | 251/214 |
| 5,129,624 | 7/1992 | Icenhower et al. | 251/214 |
| 5,192,049 | 3/1993 | Ridge | 251/214 |
| 5,203,370 | 4/1993 | Block et al. | 251/214 |
| 5,234,194 | 8/1993 | Smith | 251/214 |
| 5,263,682 | 11/1993 | Covert et al. | 251/214 |

*Primary Examiner*—George L. Walton
*Attorney, Agent, or Firm*—Willian Brinks Hofer Gilson & Lione

[57] ABSTRACT

A retrofit second packing chamber for quarter-turn valves that permits existing valves to be modified so as to meet modern emission standards without requiring replacement of the valves, and which can be assembled to existing valves in a simple, efficient manner at reasonable cost.

The retrofit second packing chamber comprises an assembly which defines a second packing chamber to be assembled to the existing first packing chamber of a valve in series therewith so as to substantially increase the protection against undesired emissions from the valve.

16 Claims, 6 Drawing Sheets

RETROFIT SECOND PACKING CHAMBER FOR QUARTER-TURN VALVES

BACKGROUND OF THE INVENTION

1. Field of the Invention

The present invention relates generally to the field of fluid control valves; and, more particularly, to a retrofit second packing chamber for quarter-turn valves to assist manufacturers and end users of process equipment in meeting new, more stringent requirements regarding the control of fugitive emissions.

2. Description of the Prior Art

Valves are commonly used in industry to restrict, divert, or blend flows of fluids. Most valves have the problem of sealing the valve stem or shaft used to transmit actuator motion from outside the valve to the closure member (which may be a plug, disc, ball, gate, etc.) inside the pressurized zone of the valve. Valve stems are typically sealed through a packing chamber (stuffing box) and/or a bellows-type seal. The design of such seals varies greatly depending on the style and type of valve, the particular application in which the valve is to be used and the manufacturer.

One particularly popular type of valve is referred to as a quarter-turn valve. Quarter-turn valves include valves of the ball, butterfly and plug types, etc., and open and close with a one-quarter turn rotation of the valve stem.

Quarter-turn valves are used in numerous applications. Some applications require that the valve be operated infrequently, while other applications require that the valve be used frequently on a regular basis. Such valves may also be used under conditions in which pressures may range from a vacuum to in excess of 5000 psig, and in which temperatures may range from cryogenic to greater than 1500° F.

Irrespective of the application of the valve, the general concept of compressing a deformable sealing material or packing between the wall of the packing chamber and the valve stem to seal around the valve stem is consistent. Most packing chambers can be relatively easily adjusted to obtain an adequate seal when the valve is new. As the packing ages, however, it wears and leakage eventually tends to occur. As the packing wears, the packing chamber can usually be adjusted to apply increased pressure to the packing to reduce leakage. In time, however, the packing may harden to the point that further adjustment becomes impossible, and the packing must then be replaced.

As a result of increasing worldwide concern about the presence of noxious, toxic and hazardous compounds in the atmosphere, legislation is now in place or is being proposed in most industrialized nations of the world focusing on volatile hazardous air pollutants and volatile organic compound emissions. For example, in the United States, the 1990 Clean Air Act Amendments define 189 chemicals for which leakage to the atmosphere is considered fugitive emissions; and new regulations are being proposed which will severely limit permissible emissions of such chemicals. Such regulations will have a major impact on users of process valves, and many current valves on the market simply do not meet the stringent requirements of the proposed new legislation. Such valves will have to be replaced or otherwise modified to meet such requirements at substantial cost to manufacturers and end users of process equipment incorporating such valves.

SUMMARY OF THE INVENTION

The present invention provides a retrofit second packing chamber for quarter-turn valves that will permit many existing valves to be modified so as to meet proposed new emission standards without requiring replacement of the valves, and which can be assembled to existing valves in a simple, efficient manner at reasonable cost.

The retrofit second packing chamber according to the present invention comprises an assembly which defines a second packing chamber to be assembled to the existing (first) packing chamber of a valve so as to substantially increase the protection against undesired emission from the valve.

The specific configuration of the retrofit second packing chamber according to the present invention depends on the type and design of the valve to be retrofitted. In general, however, the retrofit second packing chamber of the invention is adapted to be assembled to the existing first packing chamber of a valve to provide a second packing chamber in series with the first packing chamber for increased protection against leakage.

In many applications, the retrofit second packing chamber assembly according to the present invention includes a valve stem extension member adapted to be mounted to the end of the valve stem of the existing valve to extend the length of the stem to permit the retrofit second packing chamber to be assembled to the existing valve. In other applications, the retrofit second packing chamber may fit directly onto the valve stem of the existing valve without requiring the valve stem extension member.

According to one embodiment of the invention, a vent for leak detection may be provided in the retrofit second packing chamber to monitor leakage from the retrofitted valve system.

According to another embodiment of the invention, the retrofit second packing chamber comprises a "live-loaded" retrofit second packing chamber having a self-adjusting capability so as to automatically apply increased pressure to the packing of both the first and second packing chambers as the packing therein wears to automatically maintain the effectiveness of the retrofitted valve system.

In general, the present invention provides a highly effective and inexpensive means by which quarter-turn valves can be modified to meet new emission standards without requiring replacement of the valves.

Further advantages and specific details of the invention will become apparent hereinafter in conjunction with the following detailed description of presently preferred embodiments.

DETAILED DESCRIPTION OF THE PREFERRED EMBODIMENTS

Figure 1:
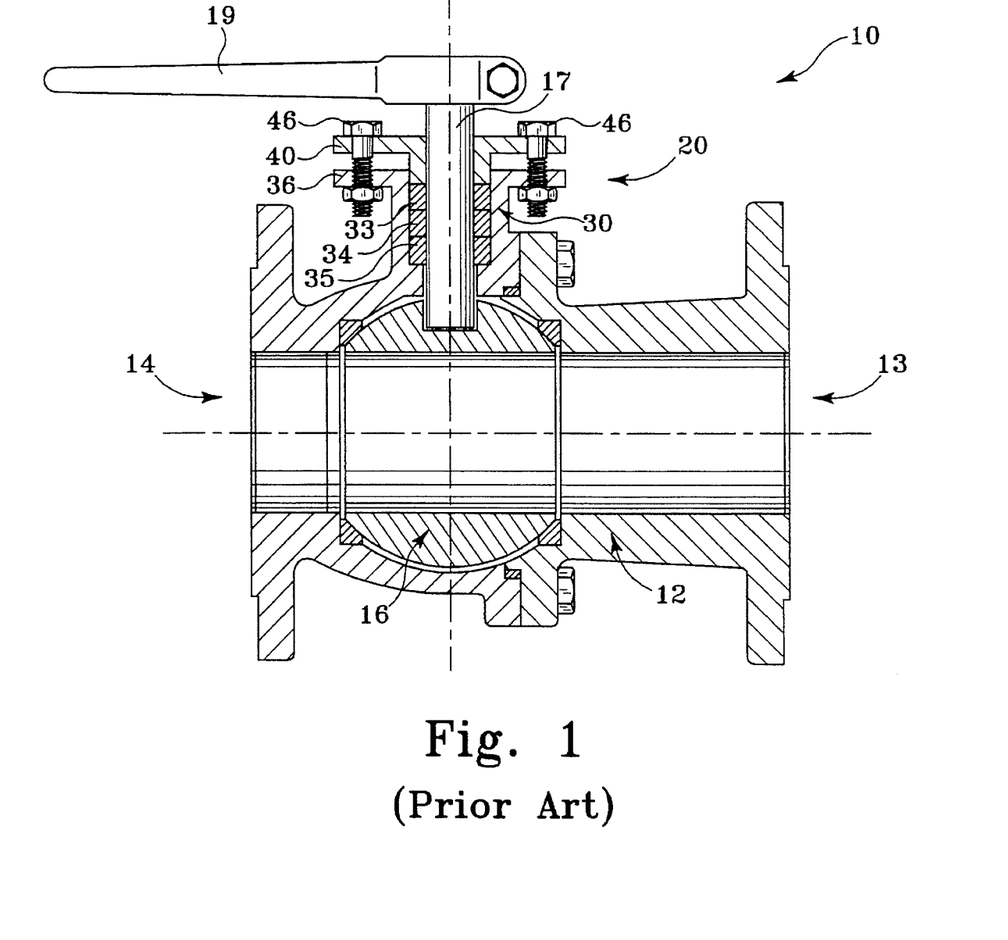
FIG. 1 is a schematic view, partially in cross-section, illustrating the overall configuration of a quarter-turn valve of common type.

FIG. 1 schematically illustrates a quarter-turn valve of common type with which a retrofit second packing chamber according to the present invention may be used. The valve is generally designated by reference number 10; and, as is well-known to those skilled in the art, is of a type commonly used to control the flow of fluid in numerous types of processing equipment. The styles of construction of quarter-turn valves are as varied as the number of manufacturers and the diversity of their applications, and valve 10 is intended to be exemplary only of the numerous types of quarter-turn valves with which the present invention may be employed.

Valve 10 generally comprises a valve body 12 having inlet and outlet ports 13 and 14, and functions to prevent or permit the flow of fluid from the inlet port 13 to the outlet port 14. To this end, valve 10 includes a valve mechanism, schematically illustrated at 16, and which may comprise a plug, disc, ball, gate or the like, positioned in the fluid path between the ports. The valve mechanism 16 is mounted to the end of a valve stem 17 which extends out of the valve body and which may be operated manually or be power-actuated to open and close the valve. In FIG. 1, a handle 19 is mounted to the outer end of the valve stem such that by rotating the handle and the valve stem and valve mechanism 16 mounted thereto through one-quarter turn, the valve can be opened and closed.

As is known to those skilled in the art, most valves in process service have stems that must be sealed to prevent leakage from the valve body to the atmosphere. There are a wide variety of seal types available including compression packing systems, bellows sealing systems and the like. The present invention can be utilized with numerous valve designs and sealing systems, and it is not intended to limit the invention to any particular configuration. In the embodiment described herein, valve 10 includes a valve stem sealing system 20 of the compression packing type.

Figure 2:
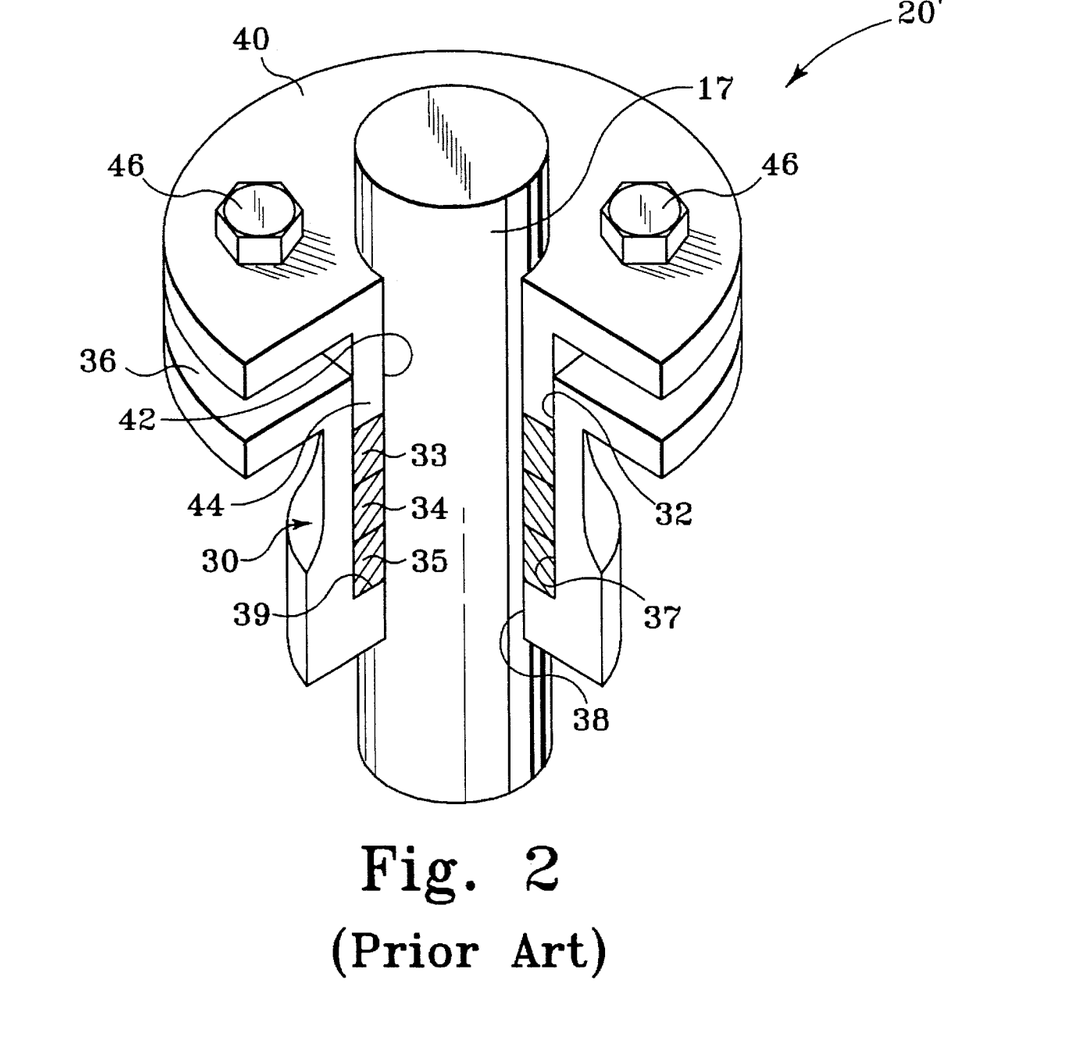
FIG. 2 schematically illustrates the packing chamber incorporated in the valve of FIG. 1.

FIG. 2 schematically illustrates a valve stem sealing system 20' which is substantially identical to system 20 of FIG. 1, but which is illustrated as a separate component in FIG. 2 to facilitate the description thereof. Like components, however, are identified by common reference numbers in FIGS. 1 and 2.

Valve stem sealing system 20' comprises a housing defining a generally cylindrical-shaped packing chamber 30 having an axial bore 32 extending therethrough and through which the valve stem 17 is adapted to extend. As shown in FIG. 2, the valve stem 17 extends upwardly into packing chamber 30 through a throat portion 38 of reduced diameter in the base of the packing chamber, through the length of bore 32 and out the top end of the packing chamber. The bore 32 is configured to receive a plurality of packing rings which are adapted to extend around the valve stem 17 and to provide an effective seal between the valve stem and the inner wall 37 of the packing chamber. Although three packing rings 33, 34 and 35 are illustrated in FIG. 2, other systems may employ a single packing ring, a different plurality of packing rings or another form of sealing system.

A packing gland follower 40 is assembled to the top end of the packing chamber 30 as shown in FIG. 2 (although illustrated as being circular in shape, such followers are often of oval or other shape as well). Follower 40 includes an axial bore 42 in alignment with bore 32 through which the valve stem 17 extends, and a downwardly extending annular flange 44 which is sized to extend into the packing chamber bore 32 as shown in FIG. 2 and to press against packing rings 33, 34 and 35 (which are supported on inwardly extending shoulder 39 at the base of the packing chamber).

The packing gland follower 40 is assembled to the packing chamber 30 by a pair of bolts 46 coupling the packing gland follower to an annular flange portion 36 of the packing chamber 30 to complete the valve stem sealing system 20' (the coupling is shown more clearly in FIG. 1), and which are tightened to apply pressure to the packing rings so as to compress and deform the rings to provide an effective seal between the valve stem and the inner wall 32 of the packing chamber. The illustrated design is such that the packing gland follower 40 can be periodically re-tightened to further compress the packing rings to compensate for wear and relaxation thereof.

The packing rings 33, 34 and 35 can take many forms and the present invention is not limited to any particular construction. Among the many types of packing materials available include acrylic, aramid, PTFE, carbon, graphite, cellulose and the like. These materials may be braided or extruded and are preferably preformed into rings using special dies.

Figure 3:
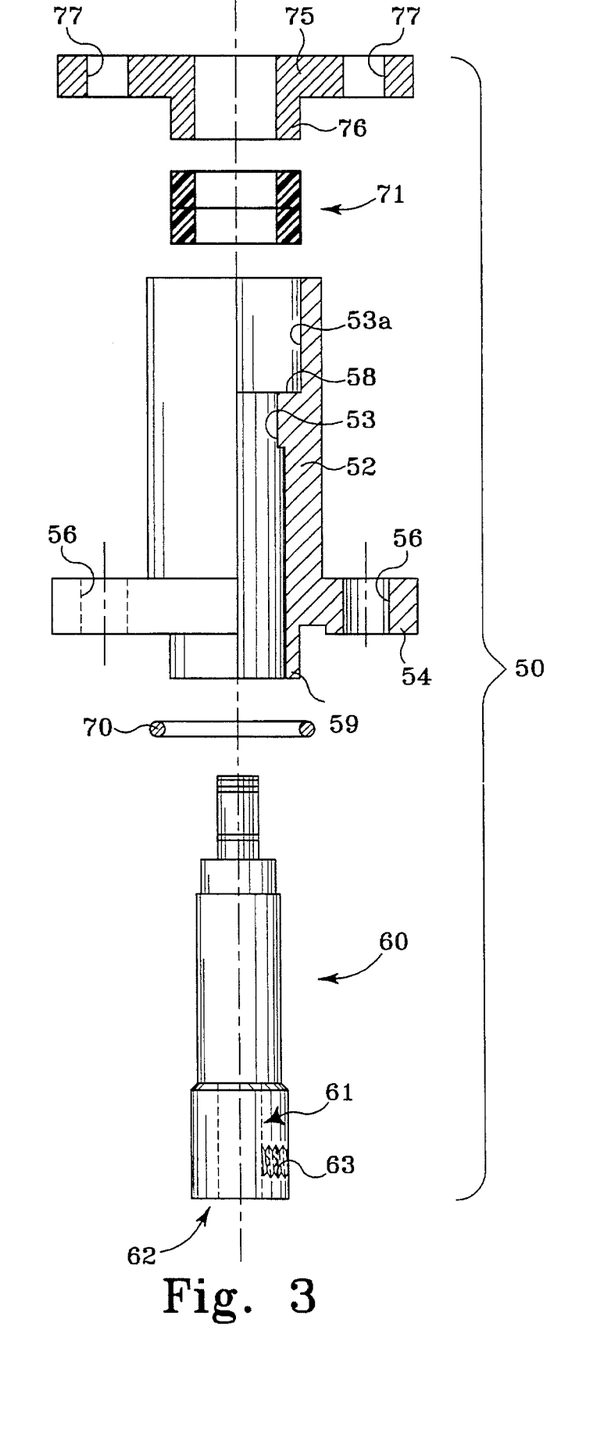
FIG. 3 is an exploded view, partially in cross-section, illustrating a retrofit second packing chamber assembly according to a presently preferred embodiment of the invention.
Figure 4:
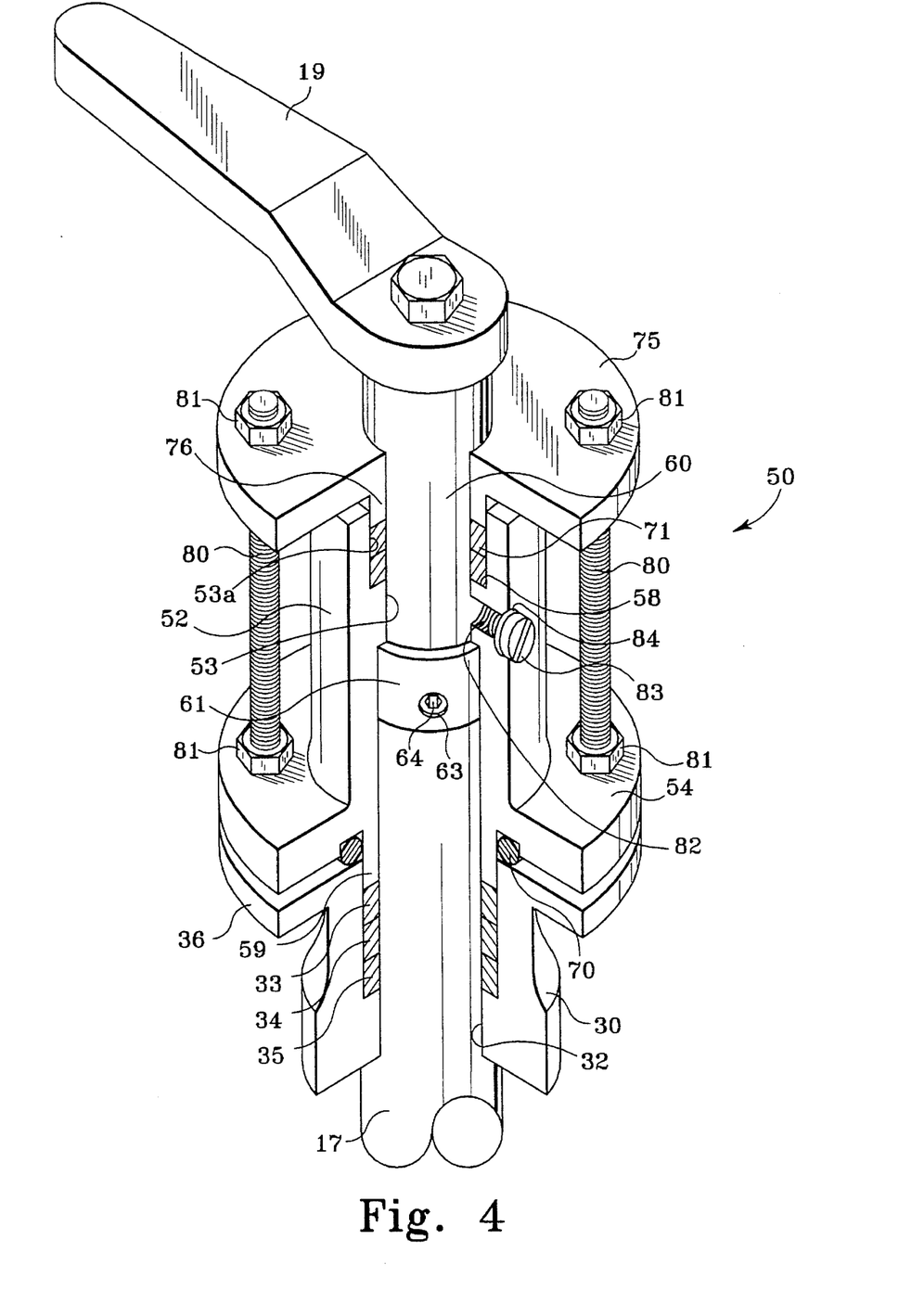
FIG. 4 is a partial cross-sectional view illustrating the retrofit second packing chamber assembly of FIG. 3 assembled to the valve packing chamber of FIG. 2.

FIG. 3 is an exploded view, partially in cross-section, illustrating a retrofit second packing chamber assembly according to a presently preferred embodiment of the invention, and which is adapted to be assembled to packing chamber 30 of FIG. 2, hereinafter often referred to as the first packing chamber 30, to provide a sealing system that will more effectively meet emission standards. FIG. 4 illustrates the retrofit second packing chamber assembled to the first packing chamber 30.

The retrofit second packing chamber assembly is generally designated by reference number 50 and includes a generally tubular-shaped second packing chamber body 52 having a bore 53 extending axially therethrough. An annular flange 54 extends outwardly from near the base of body 52 and is provided with a pair of openings 56 extending therethrough for receiving an "all thread" type bolt (see FIG. 4) or other attachment member for attachment of the assembly to the first packing chamber 30.

Reference number 60 illustrates a valve stem extension member which may be used with the retrofit second packing chamber assembly of the present invention in those applications wherein the valve stem of the valve being retrofitted is not of sufficient length to extend through the retrofit second packing chamber when the retrofit second packing chamber is assembled to the valve. The valve stem extension member 60 comprises a generally cylindrical-shaped member of appropriate length and includes a valve stem securing portion 61 for attaching the extension member to the top end of the valve stem 17 of the valve. In the illustrated embodiment, the valve stem securing portion 61 comprises an internal bore 62 for receiving the top of the valve stem 17 and an axially extending, internally threaded bore 63 carrying a small bolt 64 (see FIG. 4) which can be loosened to permit insertion of the valve stem 17 into bore 62, and tightened to lock the valve stem 17 to the valve stem extension member 60. It should be recognized that other forms of attachment can also be utilized if desired.

Valve stem 17 of valve 10 or valve stem extension member 60, when required, is adapted to extend through the central bore 53 of the retrofit second packing chamber housing 52 as shown in FIG. 4 when the retrofit second packing chamber assembly of FIG. 3 is assembled to the packing chamber of FIG. 2. An appropriate handle, such as, for example, handle 19 in FIG. 1, can be attached to the valve stem extension member as also shown in FIG. 4 to permit manual or automatically actuated rotation of the extended valve stem so as to operate the valve.

An O-ring seal 70 is provided in the retrofit second packing chamber assembly to be positioned between the housing of the first packing chamber 30 and the housing 52 of the retrofit second packing chamber 50 to provide a seal therebetween when the retrofit second packing chamber is assembled to the first packing chamber. A sealing member in the form of a packing ring or rings 71 is adapted to be received in and to substantially fill the bore portion 53a of bore 53 of the second packing chamber housing between the valve stem (or valve stem extension member) and the inner wall of housing 52. Bore portion 53a is defined by and extends upwardly from an inwardly extending annular shoulder 58 of housing 52 upon which the packing rings 71 are supported.

In order to mount the retrofit second packing chamber assembly 50 of FIG. 3 to the first packing chamber 30 of FIG. 2, it is necessary to remove the packing gland follower 40 of FIG. 2 and to replace it with the retrofit second packing chamber 50 of FIG. 3, adding the valve stem extension member 60, if required. As shown in FIG. 4, the body 52 of the retrofit second packing chamber is provided with a downwardly extending annular flange 59 which extends into bore 32 of the first packing chamber to press against packing rings 33, 34 and 35 after assembly.

After mounting of the housing 52 to the first packing chamber 30, a suitable packing gland follower 75 is mounted to the top of the housing 52.

The packing gland follower 75 can comprise a generally disc-shaped member having a downwardly extending portion 76 adapted to extend into bore portion 53a of the retrofit second packing chamber to press against the packing rings 71 so as to apply pressure thereagainst to maintain a fluid-tight seal between the valve stem (or valve stem extension member) and the inner side wall of the second packing chamber. In the embodiment illustrated in FIGS. 3 and 4, all-thread type bolts 80 are extended through openings 77 in the packing gland follower 75 and through aligned openings 56 in the lower flange 54 and in flange 36 of the first packing chamber to secure the entire assembly together. Nuts 81 are provided above and below follower 75 and above flange 54 and below flange 36 to permit adjustment of the pressure applied to packing rings 71 by downwardly extending flange 76 of follower 75, the pressure applied against packing rings 33, 34 and 35 by flange 59 of housing 52 and the pressure applied against the O-ring seal 70.

As shown in FIG. 4, the retrofit second packing chamber of the present invention is connected in series with the existing first packing chamber 30 of the valve. As a result, both packing chambers would have to leak before valve leakage can occur. The retrofit second packing chamber of the present invention thus provides significantly enhanced protection against leakage that will meet proposed new emission standards without requiring replacement of the valve.

In applications wherein the first packing chamber does not include a means for leak detection, it may be desirable to provide a vent for leak detection in the retrofit second packing chamber. FIG. 4 illustrates such a vent or "sniff port" at 82. The sniff port can comprise an internally threaded bore extending from the exterior of housing 52 into the bore 53, and typically includes a small screw 83 therein which can be tightened to seal the bore 53 and loosened to permit leak detection. An O-ring 84 is preferably provided around the head of the screw to ensure proper sealing of the vent when not in use.

Figure 5:
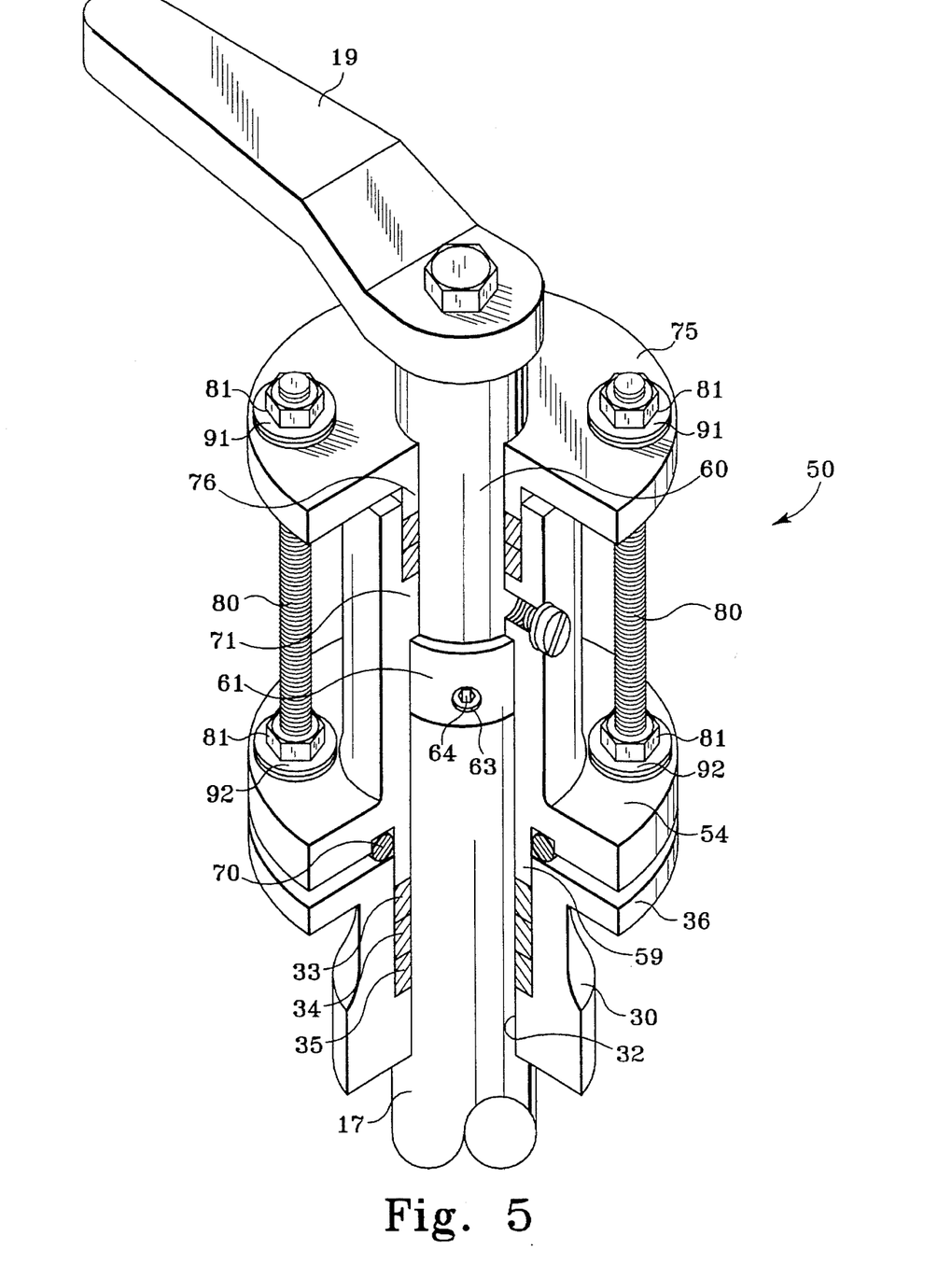
FIG. 5 is a partial cross-sectional view illustrating a retrofit second packing chamber assembly according to a second preferred embodiment of the invention.
Figure 5A:
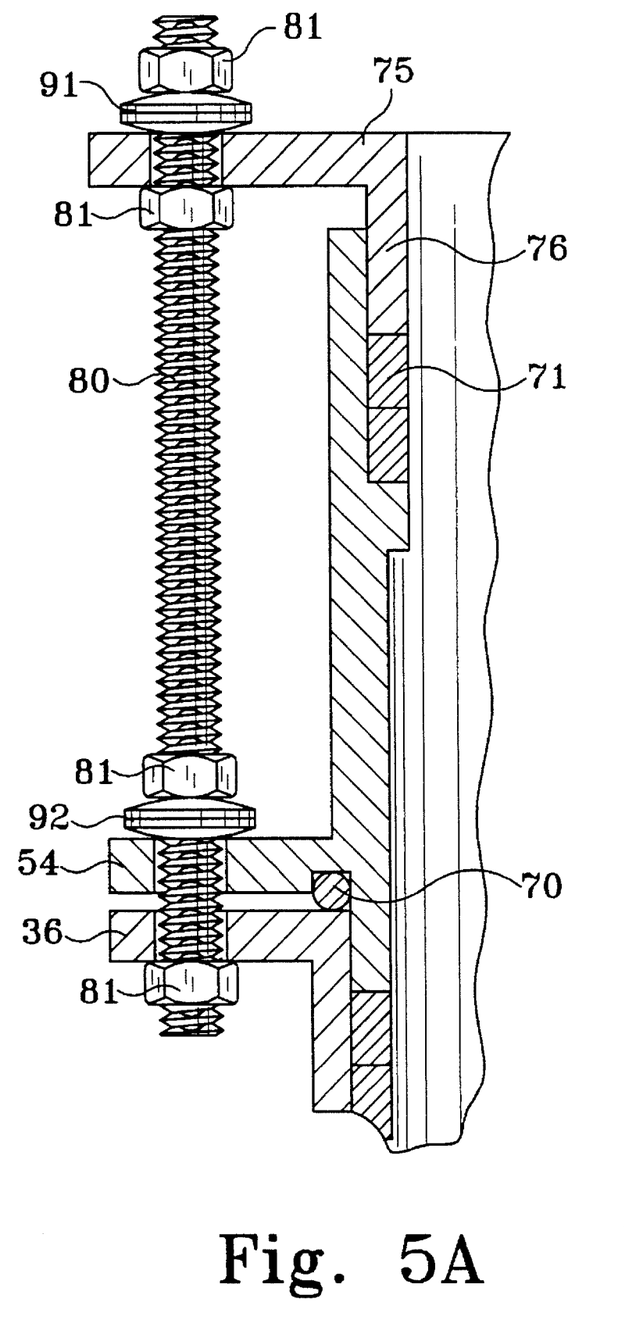
FIG. 5A is a cross-sectional view illustrating a detail of the assembly of FIG. 5.

FIGS. 5 and 5A illustrate an alternative embodiment of the invention wherein the retrofit second packing chamber is "live-loaded" to permit automatic self-adjusting of the pressure applied to the packing rings 71, the packing rings 33, 34 and 35 and the O-ring 70 as the sealing members wear so as to maintain a fluid-tight condition in the retrofitted packing chamber assembly.

As illustrated in FIGS. 5 and 5A, a pair of Belleville washers 91 are positioned around each all-thread type bolt 80 between nuts 81 and the upper surface of the packing gland follower 75. A second pair of Belleville washers 92 are positioned between nuts 81 and the upper surface of lower flange 54. When the retrofit second packing chamber is assembled to the first packing chamber, the washer pairs 91 are placed under tension and apply a downwardly extending force against the packing gland follower 75 which, in turn, causes downwardly extending flange 76 thereof to press against and compress packing rings 71. Washer pairs 92 apply a downwardly extending force against the flange 54 which presses the flange against O-ring 70 and also causes downwardly extending flange 59 thereof to press against and compress packing rings 33, 34 and 35. As the packing rings and the O-ring wear, the washer pairs will tend to compress them to an increasingly greater extent to maintain the packing rings and O-ring under proper compression so as to automatically maintain the system in a fluid-tight condition.

The retrofit second packing chamber according to this alternative embodiment of FIGS. 5 and 5A, makes it unnecessary to periodically manually adjust for wear of the packing rings and thus provides a more efficient and reliable system.

With the present invention, the retrofit second packing chamber can often be mounted to an existing valve on-line without removing the valve from the system in which it is used. In many cases, the retrofit second packing chamber can be mounted simply by means of bolts without requiring welding or other permanent methods of attachment. As the sealing members of the retrofitted valve assembly wear, it is easy to disassemble and remove the retrofit second packing chamber so as to obtain easy access not only to the packing in the retrofit second packing chamber, but also to the packing in the first packing chamber so that they may be easily replaced whenever required.

While what has been described constitutes a presently most preferred embodiment of the invention, it should be recognized that the invention could take numerous other forms. Accordingly, it should be understood that the invention should be limited only insofar as is required by the scope of the following claims.

I claim:

1. A retrofit second packing chamber for quarter-turn valves, said retrofit second packing chamber comprising a unit that can be fitted to existing quarter-turn valves of any of various types and sizes which include an existing packing chamber having an existing compression packing type sealing device therein, said retrofit second packing chamber comprising:

a retrofit body having a bore extending therethrough for receiving a valve stem mechanism and for defining a retrofit packing chamber having a compression packing type sealing device for sealing between an internal wall of said retrofit body and said valve stem mechanism extending through said bore; and means for mounting said retrofit body to a body of the existing packing chamber of the existing quarter-turn valve so that the existing packing chamber of said existing quarter-turn valve and the retrofit packing chamber of said retrofit body are arranged in series.

2. The retrofit second packing chamber of claim 1 wherein said valve stem mechanism includes a valve stem extension member attachable to a valve stem of said existing quarter-turn valve.

3. The retrofit second packing chamber of claim 1 and further including an O-ring seal positionable between said retrofit body and said body of said existing packing chamber to provide a seal therebetween when said retrofit body is mounted to said body of said existing packing chamber.

4. The retrofit second packing chamber of claim 1 and further including a closable vent in said retrofit body for leak detection and monitoring.

5. The retrofit second packing chamber of claim 1 and further including a packing gland follower attachable to said retrofit body, said follower including means for compressing said compression packing type sealing device in said retrofit body.

6. The retrofit second packing chamber of claim 5 and further including self-adjusting means for adjusting the compression force applied to said compression packing type sealing device in said retrofit body by said packing gland follower.

7. The retrofit second packing chamber of claim 6 wherein said self-adjusting means comprises at least one pair of Belleville washers.

8. A retrofitted valve system comprising:

(a) a quarter-turn valve, said quarter-turn valve comprising an existing quarter-turn valve of any of various types and sizes including:

a valve body having an inlet port and an outlet port;

a valve mechanism for preventing or permitting the flow of fluid through said valve body from said inlet port to said outlet port;

a valve stem coupled to said valve mechanism and extending out of said valve body for operating said valve mechanism; and a valve stem sealing system for sealing around said valve stem for preventing leakage from the valve body, said valve stem sealing system including a first packing chamber having a first compression packing type sealing device therein for sealing around said valve stem; and (b) a retrofit second packing chamber assembly assembled to said existing quarter-turn valve to define a retrofit second packing chamber having a second compression packing type sealing device therein arranged in series with said first packing chamber of said existing quarter-turn valve.

9. The system of claim 8 wherein said retrofit second packing chamber assembly includes:

a retrofit body having a bore extending therethrough for receiving either said valve stem of said existing quarter-turn valve or a valve stem extension member attached to said valve stem of said existing quarter-turn valve, said retrofit body defining said retrofit second packing chamber having said second compression packing type sealing device therein for sealing around either said valve stem or said valve stem extension member.

10. The system of claim 9 wherein said retrofit second packing chamber assembly includes an O-ring seal for sealing between said valve stem sealing system of said existing quarter-turn valve and said retrofit body of said retrofit second packing chamber assembly.

11. The system of claim 9 and further including a closable vent in said retrofit body for leak detection and monitoring.

12. The system of claim 9 wherein said retrofit second packing chamber assembly further includes a packing gland follower attachable to said retrofit body for compressing said second compression packing type sealing device.

13. The system of claim 9 wherein said retrofit body includes means for compressing said first compression packing type sealing device in said first packing chamber.

14. The system of claim 13 wherein said retrofit second packing chamber assembly further includes means for automatically adjusting the compression force applied to said second sealing device by said packing gland follower.

15. The system of claim 14 wherein said retrofit second packing chamber assembly further includes means for automatically adjusting a compression force applied to said first sealing device by said retrofit body.

16. The system of claim 15 wherein said automatic adjusting means comprises pairs of Belleville washers.

* * * * *